United States Patent
Hetherington et al.

[11] 3,854,326
[45] Dec. 17, 1974

[54] ROTARY ULTRASONIC TESTING APPARATUS

[75] Inventors: Matthew James Hetherington, near Market Harborough; Peter Atkinson, Stanion, near Kettering, both of England

[73] Assignee: British Steel Corporation, London, England

[22] Filed: May 31, 1973

[21] Appl. No.: 365,524

[30] Foreign Application Priority Data
June 8, 1972    Great Britain................. 26827/72

[52] U.S. Cl. ............................................. 73/67.8 S
[51] Int. Cl. ......................................G01n 9/24
[58] Field of Search...... 73/67.8 S, 67.8 R, 71.5 US, 73/67.9; 277/11

[56] References Cited
UNITED STATES PATENTS

| | | | |
|---|---|---|---|
| 3,042,414 | 7/1962 | Tracy................................. | 277/11 |
| 3,182,490 | 5/1965 | Gibson............................. | 73/67.8 S |
| 3,415,111 | 12/1968 | Chattaway et al. ........... | 73/71.5 UX |
| 3,501,947 | 3/1970 | Hetherington................... | 73/71.5 U |
| 3,533,281 | 10/1970 | Hetherington................... | 73/71.5 U |

*Primary Examiner*—Richard C. Queisser
*Assistant Examiner*—Stephen A. Kreitman
*Attorney, Agent, or Firm*—Bacon & Thomas

[57] ABSTRACT

Rotary ultrasonic testing apparatus of the kind used in testing steel tubes for example by rotating an ultrasonic probe assembly in a closed pitched spiral about each tube, comprises an annular stator carrying a first relaceable hollow tube guideway; a replaceable annular ultrasonic probe assembly disposed beyond one end of the stator and mounted for rotation on the stator; and a second replaceable hollow tube guideway mounted separate from the stator on the opposite side of the probe assembly from the stator.

7 Claims, 1 Drawing Figure

PATENTED DEC 17 1974 3,854,326
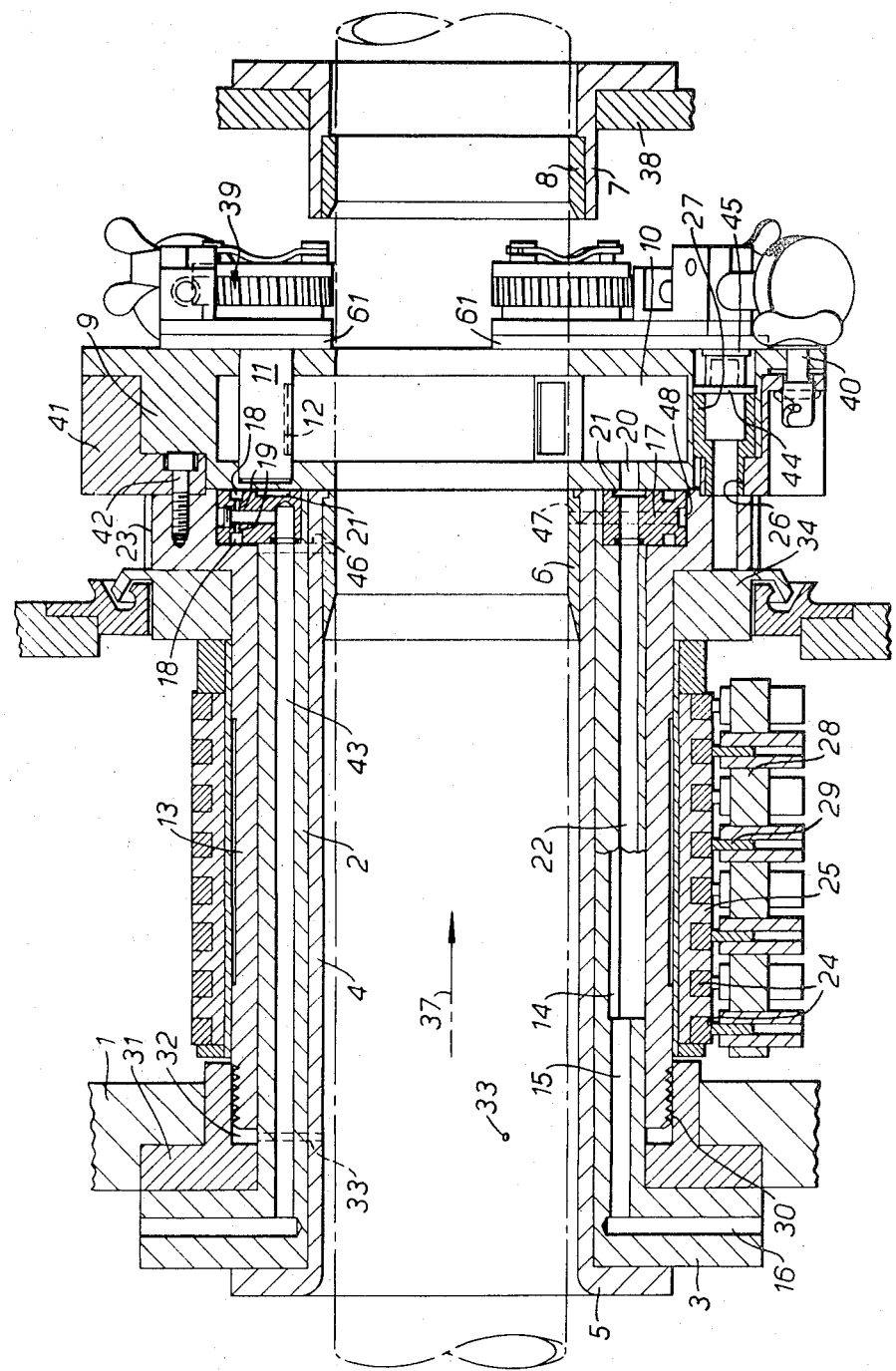

ROTARY ULTRASONIC TESTING APPARATUS

This invention relates to rotary ultrasonic apparatus of the kind used in testing steel tubes, for example, for flaws and dimensional accuracy by rotating an ultrasonic probe assembly in a close pitched spiral about the tubes.

It is an object of the present invention to provide rotary ultrasonic testing apparatus of this kind with the facility for accomodating quickly and simply tubes of differing external diameters for testing.

According to the invention there is provided rotary ultrasonic testing apparatus comprising an annular stator carrying a first replaceable hollow tube guideway, a replaceable annular ultrasonic probe assembly disposed beyond one end of the stator and mounted for rotation on the stator and a second replaceable hollow tube guideway mounted separate from the stator on the opposite side of the probe assembly from the stator.

The first guideway may comprise a sleeve fitting within the stator and replaceable by sliding away from the stator at the end opposite to the probe assembly.

The second guideway may likewise comprise a sleeve fitting within an annular mounting, replaceable by sliding from the mounting. The ultrasonic probe assembly may be secured to one end of a sleeve mounted for rotation upon the stator.

The first and second guideways may each have closely fitting internal annular inserts to provide close tolerance guides for tubes passing therethrough.

In order that the invention may be more fully understood, one embodiment thereof will now be described by way of example with reference to the accompanying drawing which is a sectional side elevation of a rotary ultrasonic testing apparatus for testing steel tubes.

The rotary test apparatus illustrated is suitable, for testing for example, steel tubes of outside diameter between ½ inch and 2¼ inches and consists essentially of two main units: a stationary unit and a rotating unit. The stationary unit comprises a stainless steel support member 1 carrying a stator in the form of a bronze stub axle 2 having an annular flange 3. A removable stainless steel tube 4 (constituting a first tube guideway) fits within the stub axle 2 and has a flange 5 at one end abutting against the flange 3 of the stub axle 2. A tightly fitting but removable "Tufnol" (Registered Trade Mark) annulus 6 is provided within one end of the tube 4, the annulus 6 acting as a close tolerance guide for tubes to be tested as they are passed through the apparatus. A stationary flanged steel tube 7 (constituting a second tube guideway) is mounted on a support 38 separate from but aligned with the tube 4. The flanged tube 7 is also provided with a tightly fitting but removable inner "Tufnol" (Registered Trade Mark) annulus 8 which acts as a close tolerance guide for the tube to be tested.

The rotating unit of the apparatus includes a rotatable probe assembly ring 9 disposed coaxially between the tubes 4 and 7.

The ring 9 is provided with an annular chamber 10 within which are mounted four ultrasonic probe transducers 11 (one only of which is shown). These transducers comprise epoxy resin stud like members having shafts of circular cross-section and a transducing crystal element 12 mounted on the shaft of each transducer.

Each of the transducers 11 is mounted in the probe assembly for rotation about the longitudinal axis of the transducer. A worm and wormwheel mechanism 39 is provided for adjusting the rotational position of each transducer so that the transducers can be very accurately aligned and adjusted for the particular direction of ultrasonic wave transmission required.

The assembly ring 9 is connected by means of four quick release clips 40 (one only being shown) to an annular support ring 41. The ring 41 is, in turn, connected by screws 42 to an annular rotor sleeve 13 fitting around the axle 2 for rotation thereabout. A hydrostatic journal bearing is provided between the sleeve 13 and the axle 2, this bearing being provided by four generally rectangular shaped recesses 14 around the outer surface of the axle 2. Each recess 14 is connected by means of an inlet orifice 15 to a water supply channel 16 (one only of each being shown in the stub axle 3.)

In addition to the provision of a hydrostatic journal bearing for the rotating unit, the apparatus incorporates a hydrostatic thrust bearing arrangement to prevent axial movement of the rotating unit, the arrangement including a bearing ring 17 having an annular groove 18 on each side. The grooves 18 are connected to two diametrically opposite water supply channels 43 (one only shown) by means of restricted orifices 19.

The bearing ring 17 is secured by screws (not shown) to the end of the stub axle 2 such that the grooved outer portion of one of its faces abuts against the end of the rotor sleeve 13, whilst the other grooved face abuts against one side of the ring 9.

In use, the ultrasonic transducers 11 are coupled to the tube to be tested via water, and to this end the annular chamber 10 is arranged to be filled and kept filled with water by means of a plurality of orifices 20 (one only shown) spaced around the ring 9 and connecting with an annular groove 21 formed in the end of the bearing ring 17. The annular groove 21 is itself connected with two diametrically opposite water supply channels 22 (one only shown).

The rotor sleeve 13 is provided with a toothed flange 23 which is engaged by a driving belt (not shown) for rotation of the sleeve.

The rotor sleeve 13 carries an integral slip ring unit comprising eight slip rings 24 moulded into an annular block 25 of electrically insulating material. Each transducer 11 is connected to a separate pair of rings 24 via electrical leads (not shown) passing through bores (not shown) in the sleeve 13, four coaxial pin and socket connectors 44 and 45 (one set only shown) mounted respectively in an insulating support 27 fitting within a bore 26 in the support ring 41, and a board 61, and leads (not shown) printed on the outer surface of the board 61 from the socket 45 to the transducer. A brush assembly 28 carries brushes 29 connecting to the rings 24 whereby the probes are connected to an external power source and monitoring unit.

It is necessary to ensure that in use no water from the liquid bearings or from the ultrasonic coupling leaks to the slip rings and brushes, and to this end water exhausting from the journal bearing at the flanged end is prevented from entering the slip ring area by means of a spiral thread 30 provided on the outer surface of the sleeve 13 running in a close fitting housing 31, the thread 30 being in such a sense as to retain the water in the annular gap 32 at the end of the sleeve 31. To eliminate pressure build up within the gap 32, it communicates with the interior of the stainless steel tube 4 by means of bleed orifices 33.

At the other end of the journal bearing the slip ring assembly is protected from the ingress of water by means of a thrower ring assembly 34 mounted on the rotor sleeve 13.

To eliminate liquid pressure build up due to leakage from the hydrostatic bearings, bleed orifices 46 and 47 extend through the wall of the stub axle 2 to the interior of the annulus 6, and from an annular groove 48 in the bearing ring 17 to the interior of the annulus 6 respectively.

For operation of the apparatus, water is supplied to the water supply channels 16 and 43, filling the recesses 14 of the journal bearing and the annular grooves 18 of the thrust bearing with water under pressure, so that the bearings are hydrostatically acting. Water escaping from the hydrostatic bearing bleeds through the ofifices 33, 46 and 47.

Water is also supplied to the supply channels 22 so that the annular chamber 10 in the ring 9 is provided with water via the annular groove 21 and orifices 20.

Once the hydrostatic bearings are acting, the rotor sleeve 13, and hence the transducer assembly, can be rotated. Because of centrifugal action, the annular chamber 10 will now completely fill with water, and the apparatus is ready to receive a tube for testing. This is fed into the apparatus in the direction of arrow 37.

The tube now passes through the rotating ring 9, and because the annular chamber 10 is filled with water, it becomes immediately coupled, through the water, to the transducers 11, so that ultrasonic testing of the tube can commence at once.

If tubes of a different size are to be tested, the apparatus can readily be adapted to accomodate the new size, by sliding out the steel tube 4 in the direction of its flanged end, and replacing it with a new tube having an annulus 6 of appropriate wall thickness for the new size of the tubes to be tested; similarly replacing the steel tube 7; and by releasing the assembly ring 9 from the support ring 41 by disconnecting the quick release clips 40, removing the ring assembly 9 transversely from the apparatus (which simultaneously disconnects the pin and socket connectors 44 and 45), and then replacing it with a new assembly of appropriate internal diameter.

It will be seen that by locating the probe assembly at one end of the main stator assembly, the apparatus according to the invention has great facility for quick adaptation in order to receive for testing tubes of differing external diameters.

We claim

1. Rotary ultrasonic testing apparatus comprising a single annular stator carrying a first replaceable hollow tube guideway; a replaceable annular ultrasonic probe assembly disposed beyond one end of the stator and mounted for rotation solely on said single annular stator; and a second replaceable hollow tube guideway mounted separate from the stator on the opposite side of the probe assembly from the stator.

2. Testing apparatus as claimed in claim 1 wherein the first guideway comprises a sleeve fitting within the stator and replaceable by sliding away from the stator at the end opposite to the probe assembly.

3. Testing apparatus as claimed in claim 1 wherein the second guideway comprises a sleeve fitting within annular mounting replaceable by sliding from the mounting.

4. Testing apparatus as claimed in claim 1 wherein the ultrasonic probe assembly is secured to one end of a sleeve mounted for rotation upon the stator.

5. Testing apparatus as claimed in claim 1 wherein the first and second guideways have closely fitting internal annular inserts to provide close tolerance guides for tubes passing therethrough.

6. Rotary ultrasonic testing apparatus comprising a single annular stator carrying a first replaceable hollow tube guideway; a replaceable annular ultrasonic probe assembly disposed beyond one end of the stator and mounted for rotation solely on said single annular stator, said probe assembly comprising an annular chamber open on its radially inner side within which are mounted a plurality of ultrasonic probe transducers; and a second replaceable hollow tube guideway mounted separate from the stator on the opposite side of the probe assembly from the stator.

7. Testing apparatus as claimed in claim 6 wherein each probe transducer comprises a cylindrical shaft having an ultrasonic transducer element carried on one side thereof, the shaft being rotatably mounted in a bore in the probe assembly extending parallel to the rotational axis of the assembly, whereby alignment of the probe transducers can be adjusted while mounted.

* * * * *